United States Patent

Hitomi

Patent Number: 5,364,041
Date of Patent: Nov. 15, 1994

[54] OSCILLATING MECHANISM FOR A SPINNING REEL

[75] Inventor: Yasuhiro Hitomi, Hashimoto, Japan

[73] Assignee: Shimano Inc., Osaka, Japan

[21] Appl. No.: 939,602

[22] Filed: Sep. 2, 1992

[30] Foreign Application Priority Data

Sep. 9, 1991 [JP] Japan ............................ 3-071902[U]

[51] Int. Cl.⁵ .............................................. A01K 89/01
[52] U.S. Cl. ..................................................... 242/242
[58] Field of Search ................................ 242/241, 242

[56] References Cited

U.S. PATENT DOCUMENTS

| | | | |
|---|---|---|---|
| 3,520,488 | 7/1970 | Vouthier | 242/242 X |
| 5,012,990 | 5/1991 | Kawabe | 242/242 |
| 5,118,047 | 6/1992 | Carpenter et al. | 242/241 |
| 5,143,318 | 9/1992 | Tipton et al. | 242/241 |
| 5,167,381 | 12/1992 | Henriksson et al. | 242/242 |

FOREIGN PATENT DOCUMENTS

| | | | |
|---|---|---|---|
| 138919 | 10/1950 | Australia | 242/242 |
| 914251 | 10/1946 | France | 242/242 |

*Primary Examiner*—Daniel P. Stodola
*Assistant Examiner*—Michael R. Mansen
*Attorney, Agent, or Firm*—Dickstein, Shapiro & Morin

[57] ABSTRACT

An oscillating mechanism for a spinning reel has a drive pin formed on a gear of a rotary frame drive system, and an engaging slot formed in a driven member of a spool reciprocating system. The drive pin and engaging slot are engaged for causing a spool to reciprocate through fixed strokes axially thereof with a line winding movement of a rotary frame. The drive pin includes a proximal portion connected to the gear, and a distal engaging portion engaged with the engaging slot. The distal engaging portion is disposed outwardly of tooth bottoms of the gear.

3 Claims, 2 Drawing Sheets ic # OSCILLATING MECHANISM FOR A SPINNING REEL

BACKGROUND OF THE INVENTION

2. Field of the Invention

This invention relates to an oscillating mechanism for a spinning reel, and more particularly to an oscillating mechanism for a spinning reel having a drive pin formed on a gear of a rotary frame drive system, and an engaging slot formed in a driven member of a spool reciprocating system and engaged with the drive pin, for axially reciprocating a spool through fixed strokes with an operation of a rotary frame to wind a fishing line.

2. Description of the Related Art

An oscillating mechanism for a spinning reel as constructed above has a drive pin formed on a gear of a rotary frame drive system, and this pin includes a proximal portion connected to the gear, and a distal portion for engaging an engaging bore formed in an arm acting as a driven member of a spool reciprocating system. The distal engaging portion of the pin is disposed at a shorter distance to the center of the gear than tooth bottoms thereof are (see Japanese Utility Model Publication No. 1990-974, for example).

In this prior construction, the distal engaging portion of the pin has a smaller radius of revolution than teeth of the gear. Thus, the spool is reciprocable through short strokes, which requires a fishing line to be wound with adjacent wraps closer to one another than where a fishing line of the same length is wound on a spool reciprocable through longer strokes. A strong resistance is produced by contact among wraps of the fishing line at a bait casting time. This could result in an insufficient casting distance.

SUMMARY OF THE INVENTION

An object of the present invention is to provide an improved spinning reel which reduces the resistance due to contact among wraps of the fishing line to realize a sufficient bait casting distance.

The above object is fulfilled, according to the present invention, by an oscillating mechanism for a spinning reel, wherein the drive pin includes a proximal portion connected to the gear, and a distal engaging portion engaged with the engaging slot, the distal engaging portion being disposed outwardly of tooth bottoms of the gear.

The above oscillating mechanism has the following functions and effects: The distal engaging portion has a greater radius of revolution than in the conventional spinning reel, whereby the spool is reciprocable through correspondingly longer strokes. Further, the spool is reciprocable at an increased rate relative to a rotating rate of the rotary frame. This allows a fishing line to be wound with larger spacing between adjacent wraps on the spool, thereby reducing the resistance due to contact among wraps of the fishing line.

Consequently, the fishing line may be wound with increased spacing between adjacent wraps without reducing length of the line wound on spool, which allows a bait to be thrown to a remote point during a bait casting operation. Moreover, the invention involves no limitation to design freedom in that there is no need to vary the pitch diameter of the gear.

Further and other objects, features and effects of the invention will become more apparent from the following more detailed description of the embodiments of the invention taken with reference to the accompanying drawings.

DETAILED DESCRIPTION OF THE PREFERRED

An oscillating mechanism of a spinning reel according to the present invention will be described in detail with reference to the drawings.

Figure 4:
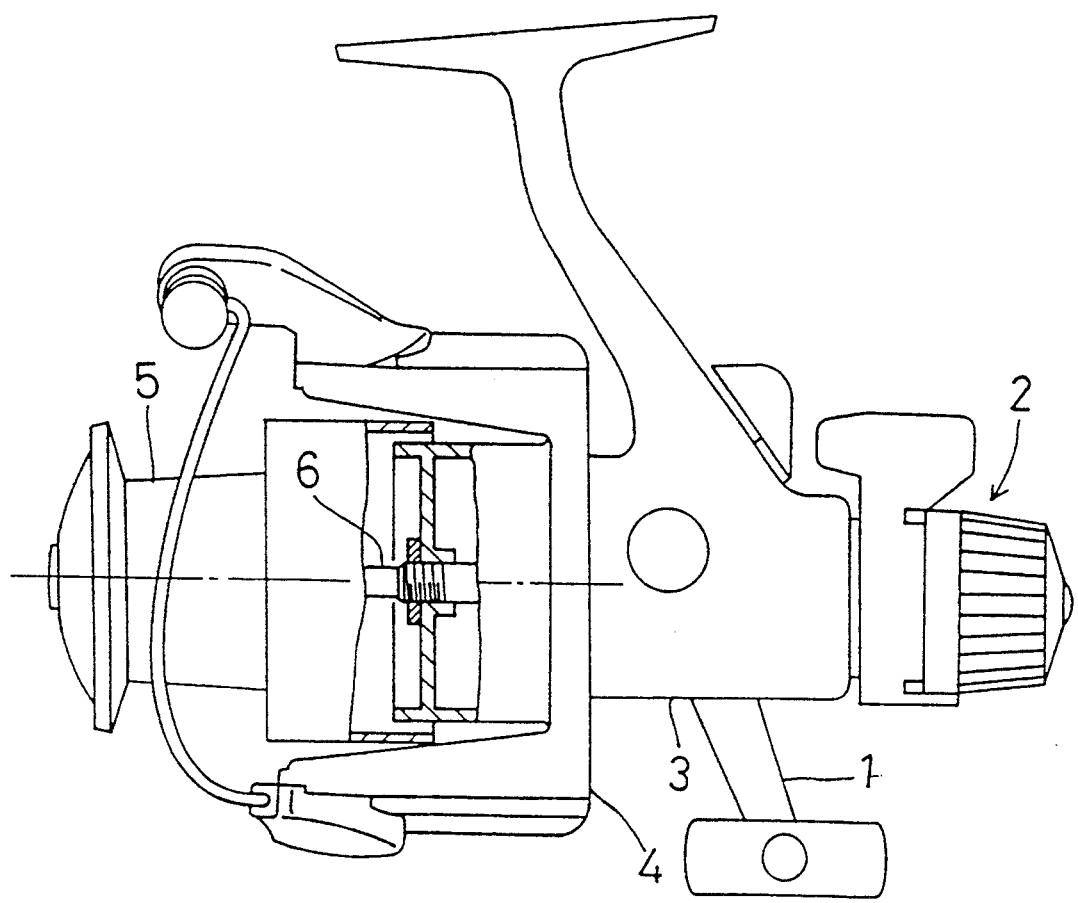
FIG. 4 is a side view partly in section of a spinning reel.

This spinning reel is constructed as shown in FIG. 4. The spinning reel includes a line winding handle 1 attached to a reel body 3, a rear drag controller 2 attached to a rear end of the reel body 3, and a rotary frame 4 and a spool 5 disposed forwardly of the reel body 3 to be driven by the handle 1. The rotary frame 4 is mounted on a spool shaft 6 to be rotatable relative thereto, while the spool 5 is mounted on the spool shaft 6 to be rotatable therewith.

Figure 1:
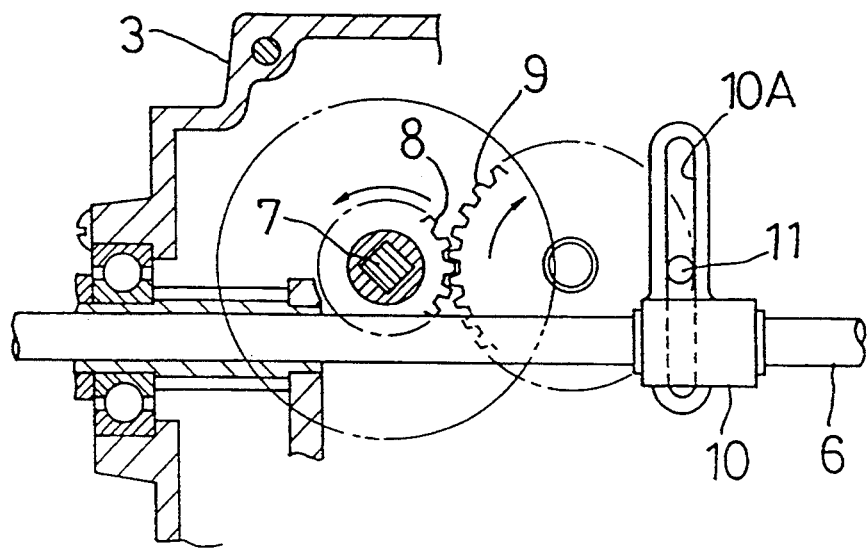
FIG. 1 is a side view in vertical section showing a drive oscillating mechanism.
Figure 2:
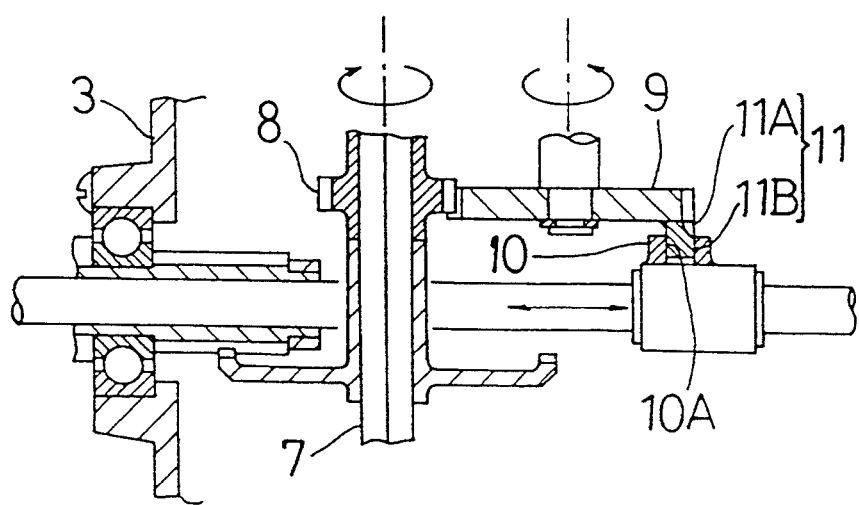
FIG. 2 is a plan view of the drive structure.

The oscillating mechanism will be described with reference to FIGS. 1 and 2. The reel body 3 supports a handle shaft 7 rotatable with the handle 1. The handle shaft 7 has a first drive gear 8 fixed thereto to be driven by the handle 1. A second drive gear 9 is meshed with the first drive gear 8 to output a reduced drive. The spool shaft 6 has a driven member 10 relatively rotatably mounted thereon and opposed to the second drive gear 9. The driven member 10 is reciprocable with the spool shaft 6 axially thereof. A drive pin 11 projects from a side surface of the second drive gear 9, while the driven member 10 has an engaging slot 10A defined in a side thereof opposed to the drive gear 9 for engaging the drive pin 11. Thus, drive is transmitted from the second drive gear 9 to the driven member 10. The drive pin 11 includes a proximal portion 11A connected to the second drive gear 9, and a distal engaging portion 11B engaged with the engaging slot 10A. The distal engaging portion 11B is disposed on a pitch circle of the second drive gear 9. That is, the distal engaging portion 11B is disposed in a position outwardly of tooth bottoms of the second drive gear 9, to provide long reciprocating strokes and high moving rate of the driven member 10. The engaging slot 10A has a length slightly greater than a pitch diameter of the second drive gear 9, and a width to accommodate sliding movement of the drive pin 11.

Figure 3:
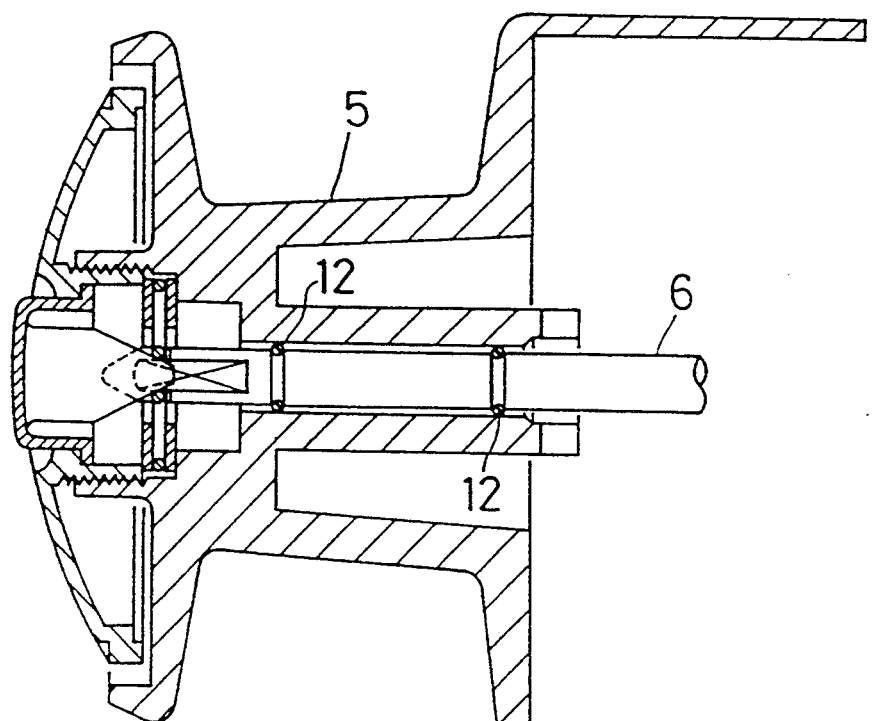
FIG. 3 is a side view in vertical section showing a way in mounted on a spool shaft.

As shown in FIG. 3, two O-rings 1.2 are fitted with axial spacing therebetween on the spool shaft 6 rotatable with the spool 5, to prevent chattering between the spool 5 and spool shaft 6. These O-rings 12 have an outside diameter greater than an inside diameter of the spool 5 for tight contact with the spool 5 mounted on the spool shaft 6.

The O-rings 12 may be fitted on inner walls of the spool 5, with the inside diameter of the O-rings 12 being smaller than an outside diameter of the spool shaft 6.

The foregoing embodiment may be modified as follows:

(1) The drive pin 11 may be formed on a sprocket instead of the gear.

(2) The drive pin 11 may be formed on a gear for a timing belt.

(3) The distal engaging portion 11B of the drive pin 11 may be disposed outwardly of tooth tops of the second drive gear 9.

What is claimed is:

1. A spinning reel comprising:
   a first gear rotatable in accordance with rotation of a handle;
   a second gear having an axis of rotation, said second gear being engaged with said first gear, said second gear having a side face, said second gear having radially outwardly projecting teeth, with spaces defined between said teeth, said teeth having radially outer portions, said spaces having radially inner portions, the distance between said inner portions of said spaces and said axis of rotation being less than the distance between said outer portions of said teeth and said axis of rotation;
   a reciprocatable spool shaft; and
   a reciprocating mechanism for reciprocating said spool shaft, said reciprocating mechanism comprising:
   a drive pin formed on said side face of said second gear, said drive pin including a proximal portion and a distal portion, said proximal portion being located adjacent to said side face; and
   a driven member fixed on said spool shaft, said driven member defining an engaging slot for receiving said drive pin, said distal portion of said drive pin being slidable in said engaging slot while remaining engaged within said slot, such that rotation of said second gear is converted to reciprocating movement of said spool shaft; and
   wherein said distal portion of said drive pin has a radially outermost portion, the distance between said axis of rotation of said second gear and said radially outermost portion of said distal portion of said driving pin being greater than the distance between said axis of rotation and said inner portions of said spaces between said teeth.

2. A spinning reel as claimed in claim 1, wherein said drive pin defines a space for receiving a tooth of said first gear, said space being located between said proximal and distal portions of said drive pin.

3. A spinning reel as claimed in claim 1, wherein said engaging slot has a length slightly greater than a pitch diameter of said second gear, and a width to accommodate sliding movement of said drive pin.

* * * * *